Figure 1:
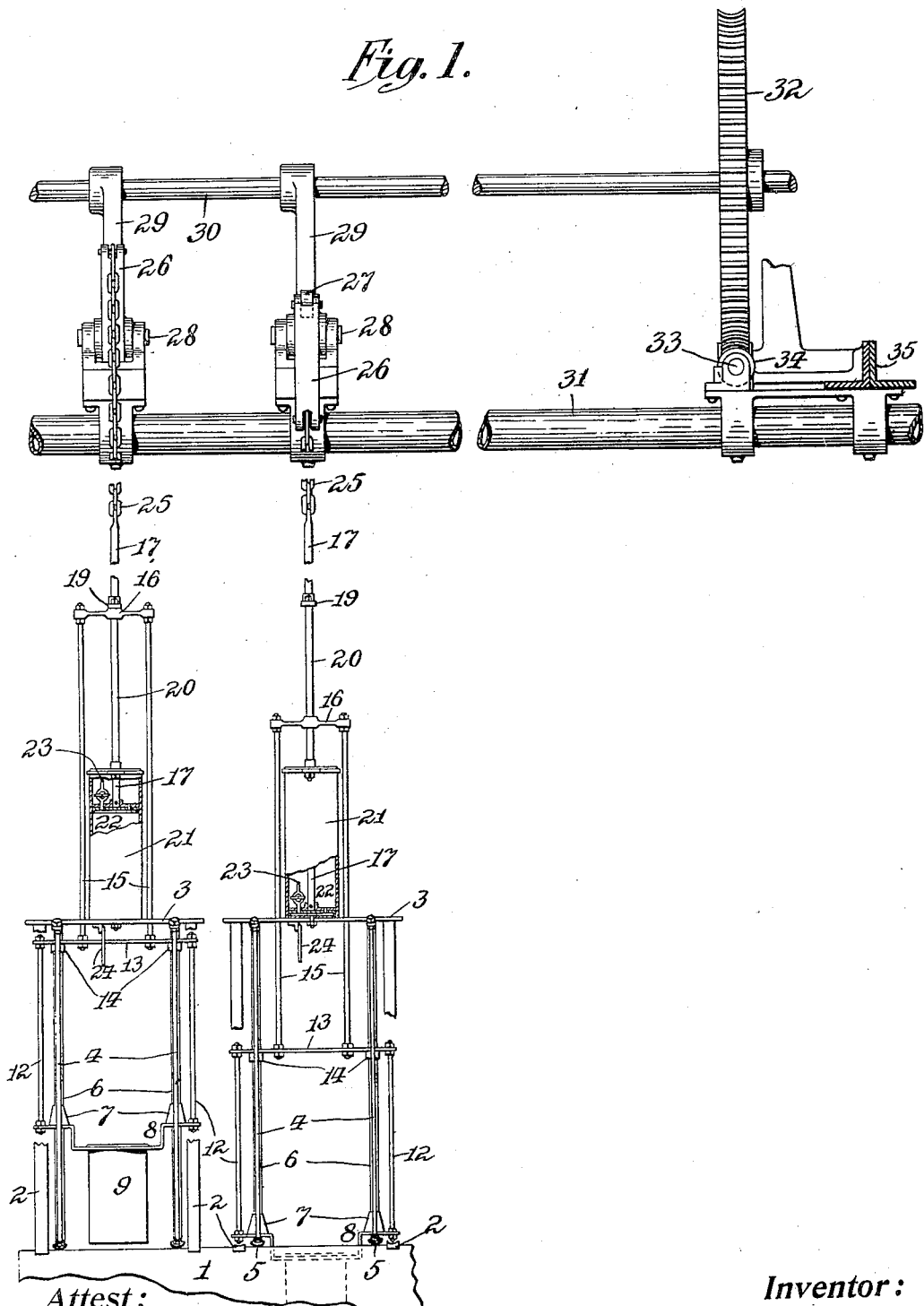

No. 817,831.  
PATENTED APR. 17, 1906.  
E. L. AIKEN.  
MOLDING APPARATUS.  
APPLICATION FILED MAR. 23, 1905.

2 SHEETS—SHEET 2.

Attest:  
Edgworth Greene  
Delos Holden

Inventor:  
Edward L. Aiken  
by Frank L. Dyer  
Atty.

UNITED STATES PATENT OFFICE.

EDWARD L. AIKEN, OF EAST ORANGE, NEW JERSEY, ASSIGNOR TO NEW JERSEY PATENT COMPANY, OF WEST ORANGE, NEW JERSEY, A CORPORATION OF NEW JERSEY.

MOLDING APPARATUS.

No. 817,831. Specification of Letters Patent. Patented April 17, 1906.

Application filed March 23, 1905. Serial No. 251,662.

*To all whom it may concern:*

Be it known that I, EDWARD L. AIKEN, residing at East Orange, in the county of Essex and State of New Jersey, have invented certain new and useful Improvements in Molding Apparatus, of which the following is a description.

My invention relates to apparatus for use in the molding of phonograph-records, and preferably the molding process described in Patent No. 683,615, granted October 1, 1901, to Walter H. Miller and Jonas W. Aylsworth, wherein a hollow cylindrical mold bearing upon its interior surface a phonographic record in relief is dipped into molten material suitable for forming records, so that the wax or wax-like material congeals and forms a deposit upon the bore of the cylinder, whereupon the mold is then raised out of the tank containing the molten material and the congealed wax is reamed out while still warm. The mold being then chilled, the record contracts and may be drawn out from the mold by a relative longitudinal movement without injury to the record-groove.

In apparatus used heretofore for supporting the molds and raising and lowering the same it is common to support six mold-carriers side by side above a long tank, so that one operator can attend to the operation of six molds. The operation of such apparatus is as follows: The mold being in position to be lowered into the tank, the mold-carrier is allowed to descend by its own weight, slow and uniform motion being obtained by means of a dash-pot. The operator passes to the next mold, which has been immersed in the molten material the proper length of time to form a record, and raises the same by means of a rope passing over a pulley, the mold-carrier being held in its proper position by a sustaining-hook. The operator then removes the mold from the carrier, inserts a fresh mold, and releases the mold-carrier, allowing the same to descend, as before described. He then passes on to the next mold-carrier, which is in its lowered position, and repeats the operations just described. In this manner he finishes up the row of six mold-carriers, and upon his return to the first a sufficient length of time has elapsed for the molding or congealing of the wax in the first mold, and the entire apparatus is in condition for a second cycle of operations exactly similar to the first. This manner of operating a molding apparatus requires a considerable expenditure of labor in raising the mold-carriers, so that after several hours of work operators do not generally work as rapidly as at first and the quantity of work turned out within a given time is diminished even though the slowing up of the operator may be so slight as not to be noticeable. Furthermore, an indolent operator is at any time able to greatly reduce the number of records which the apparatus is capable of producing within a given time without the slowing up being very apparent.

It is the object of my invention to provide an apparatus which will either produce the greatest possible number of records within a given time or else will indicate that it is not being operated at full capacity.

Reference is hereby made to the accompanying drawings, in which the same reference-numerals indicate corresponding parts in both views, of which—

Figure 2:
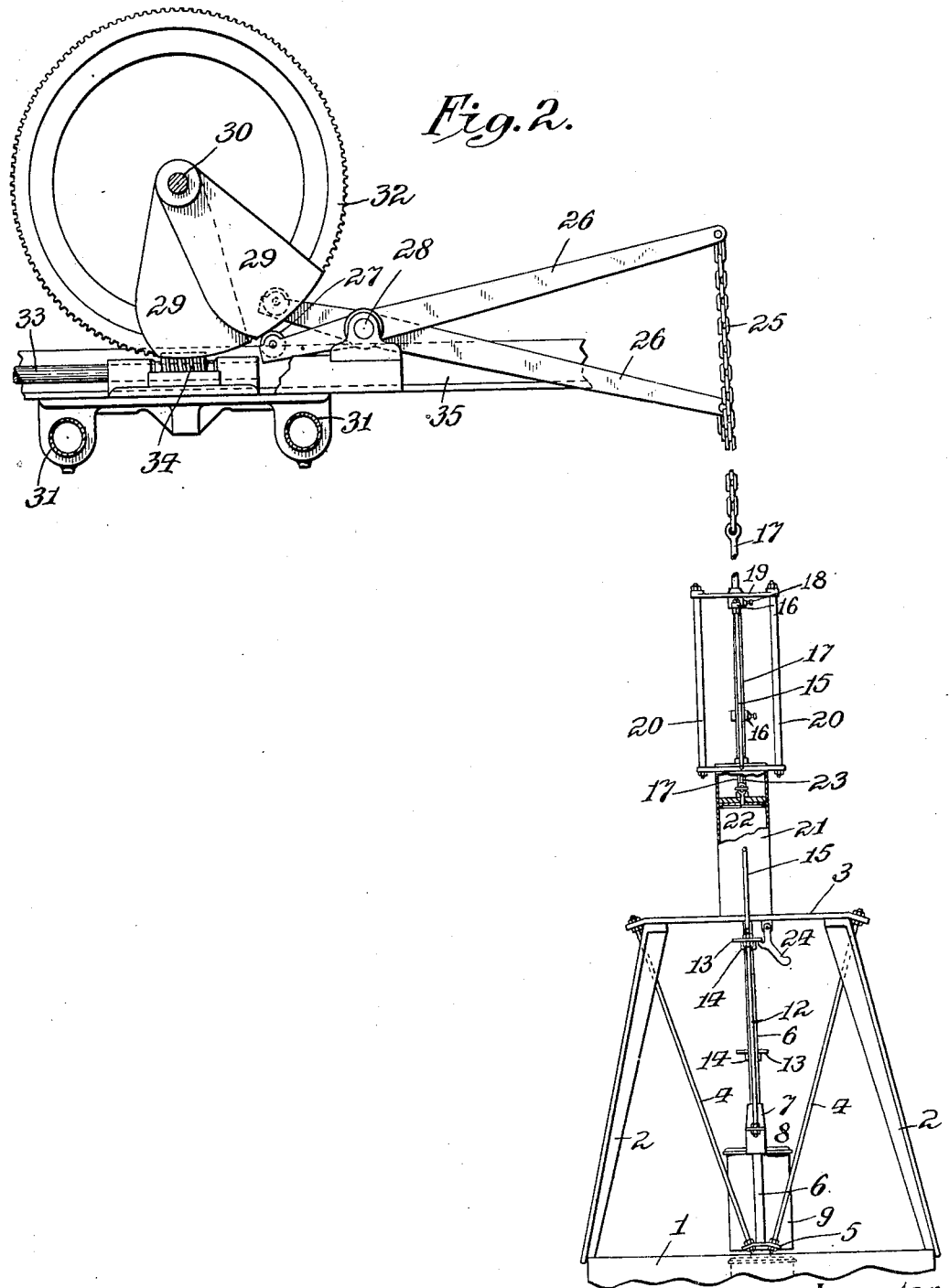

Figure 1 is a side elevation, partly in section, of one form of device in which my invention may be embodied; and Fig. 2 is a front elevation, partly in section, of the same.

In the apparatus shown 1 is a tank of any suitable form for containing molten material from which the records are to be formed. This tank supports the legs or standards 2 of the dipping apparatus, said legs or standards carrying a top plate or frame 3 at their upper ends. Extending downwardly from the top frame are rods 4 4, at each side, connected together at their lower ends by plates 5. Guide-rods 6 extend between the plates 5 and the top frame 3. Mounted to slide longitudinally of the guide-rods 6 are sleeves 7 7, formed on a yoke 8, having a central opening therein for receiving a dipping-can 9. Connecting-rods 12 extend between the yoke 8 and an upper yoke 13, formed with sleeves 14, also movable on the guide-rods 6. Extending upwardly from the yoke 13 are connecting-rods 15, secured together at their tops by a cross-head 16, through which extends a rod 17, adjustably connected with the cross-head by a set-screw 18. The rod 17 is guided in a bearing by a stationary yoke 19, supported by standards 20 from the top of a dash-pot cylinder 21. A piston 22 works in this cylinder and connects with the lower end of the rod 17. This piston is provided with a petcock 23, which may be opened more or less to regulate the descent of the cylinder.

The rod 17 is connected by means of a chain or coupling 25 with one end of a lever 26, which is pivoted at 28 to a suitable support 31 and carries at its inner end a roller 27 for engagement with a cam 29. A cam-shaft 30 extends parallel to the row of mold-carriers, and a cam is provided for elevating each of said carriers. Therefore for a set of six mold-carriers there will be six cams, and in order that the proper cycle of operations may take place each cam will be placed on the shaft at a different angle, so that they will operate successively in regular sequence and at regular intervals of time. Thus when six cams are used they will be placed sixty degrees apart around the shaft. It is immaterial in what order the several cams operate so long as they operate successively and at regular intervals.

The shaft 30 is rotated slowly at a constant speed by means of any suitable mechanism. I have shown for this purpose a driving-shaft 33, which may be driven by an electric motor. The said shaft is provided with a worm 34, which meshes with the worm-wheel 32 on the shaft 30. A cross-beam 35 is provided as an additional support.

Each of the cams 29 is so formed that it raises the mold-carrier with a slow practically uniform motion from its lowest to its highest position. It then holds the same in the latter position for a fixed length of time, which is usually sufficient to enable the operator to remove the filled mold from the carrier and replace the same by a new empty mold. While this operation is going on the next mold-carrier is being raised, and just as it reaches its highest position the first cam passes the roller and allows the first mold-carrier to descend of its own weight.

Depending from the top frame or plate 3 is a latch 24, which swings rearwardly to allow the yoke 13 to ascend slightly above the latch, but which engages the same upon its descent and holds the mold-carrier in an elevated position until the operator is ready for the mold to be immersed, whereupon it is only necessary to withdraw the latch and permit the parts to descend by gravity. Ordinarily the operator releases the carrier as soon as it reaches the latch in its descent; but occasionally some extra time is needed. In this case the carrier is held up by the said latch while the operator arranges the new mold; but if so much time elapses that the operator has to pass on to the next mold the first mold-carrier must remain elevated for an entire cycle of operations, since the time remaining would not be sufficient for forming a perfect record in the first mold by the time at which it will be elevated by the cam-shaft.

It is sometimes desirable that the latch be removed or held in such a position that it will not intercept the yoke 13 in its descent. In this case the operator must of course replace the filled mold with an empty one while the mold-carrier is held in its elevated position by the cam, since the carrier will descend as soon as the roller 27 passes the cam. The advantage of this method of procedure is that absolute uniformity in the time and duration of the immersion of each mold is secured. The operator is thus relieved of the labor of raising the molds and can therefore work more rapidly at his other duties. Furthermore, the time formerly occupied in raising the molds is all saved, since the operator is able to work on one mold while its successor is being raised. The speed of the shaft 30 is so regulated as to allow the operator just enough time to perform the necessary work. It is impossible for him to slight the work, because if he should allow a filled mold to descend into the tank instead of a fresh empty mold the mold would become choked with material, which would of course furnish evidence that negligence had occurred. On the other hand, if the operator allows the hook 24 to hold the mold elevated so that it will not descend into the tank it will be necessary for him to leave the mold in its elevated position for an entire cycle of operations, because if he should allow it to descend too late there would not be time enough for a record to be formed in the mold at the time the cam effects the elevation thereof. It is obvious, therefore, that by means of my invention the molding apparatus can be operated at its full capacity and that if it is not so operated the fact will be at once apparent to an observer.

Having now described my invention, what I claim as new therein, and desire to secure by Letters Patent, is—

1. In a molding apparatus, the combination of a series of mold-carriers occupying depressed positions, and driven means for raising each of said mold-carriers, said means operating to raise the mold-carriers in regular sequence, substantially as set forth.

2. In a molding apparatus, the combination of a series of mold-carriers occupying depressed positions and driven means for raising each of said mold-carriers, said means operating to raise the mold-carriers in regular sequence and to hold the same in elevated positions for intervals which are shorter than the periods of depression, substantially as set forth.

3. In a molding apparatus, the combination of a series of mold-carriers occupying depressed positions, and driven means for raising each of said mold-carriers in regular sequence and for sustaining the same in its elevated position for a short period of time, said means operating to raise one carrier while the preceding carrier is in an elevated position, substantially as set forth.

4. In a molding apparatus, the combination of a series of mold-carriers occupying depressed positions, releasable means for holding each of said carriers in an elevated position, and driven means for raising said mold-carriers in regular sequence and sustaining the same in their elevated positions for a short period of time, substantially as set forth.

5. In a molding apparatus, the combination of a mold-carrier and means for intermittently raising and lowering said mold-carrier, said means operating to hold the mold-carrier in an elevated position for an interval which is shorter than the period of depression, substantially as set forth.

6. In a molding apparatus, the combination of a series of mold-carriers occupying depressed positions, and driven means for raising and sustaining each of said mold-carriers in regular sequence, the periods of depression being greater than the periods of elevation, substantially as set forth.

7. In a molding apparatus, the combination of a series of mold-carriers occupying depressed positions, and a driven cam-shaft for elevating each of said mold-carriers and holding the same in its elevated position for a fixed interval of time; the cams being placed at different angles on the shaft so as to raise the mold-carriers in regular sequence, substantially as set forth.

8. In a molding apparatus, the combination of a series of mold-carriers occupying depressed positions, a driven cam-shaft for elevating each of said mold-carriers and holding the same in its elevated position for a fixed interval of time; the cams being placed at different angles on the shaft so as to raise the mold-carriers in regular sequence, and the surfaces of said cams overlapping in such a manner that the lifting operation of one cam takes place during the holding operation of the preceding cam, substantially as set forth.

This specification signed and witnessed this 21st day of March, 1905.

EDWARD L. AIKEN.

Witnesses:
DELOS HOLDEN,
FRANK L. DYER